United States Patent
Chiurtu et al.

(10) Patent No.: US 7,684,511 B2
(45) Date of Patent: Mar. 23, 2010

(54) ANTENNA VIRTUALIZATION IN COMMUNICATION SYSTEMS

(75) Inventors: Nicolae Chiurtu, Santa Clara, CA (US); Arogyaswami Paulraj, Santa Clara, CA (US)

(73) Assignee: BECEEM Communications Inc., Santa Clara, CA (US)

( * ) Notice: Subject to any disclaimer, the term of this patent is extended or adjusted under 35 U.S.C. 154(b) by 811 days.

(21) Appl. No.: 11/506,734

(22) Filed: Aug. 17, 2006

(65) Prior Publication Data

US 2007/0041466 A1    Feb. 22, 2007

Related U.S. Application Data

(60) Provisional application No. 60/709,589, filed on Aug. 18, 2005.

(51) Int. Cl.
*H04B 7/02* (2006.01)
(52) U.S. Cl. ...................................................... 375/267
(58) Field of Classification Search ................. 375/267; 370/334; 455/101
See application file for complete search history.

(56) References Cited

U.S. PATENT DOCUMENTS

| | | | |
|---|---|---|---|
| 6,519,259 B1 * | 2/2003 | Baker et al. ............... | 370/395.4 |
| 6,731,619 B1 * | 5/2004 | Ramesh et al. ............. | 370/334 |
| 7,148,845 B2 * | 12/2006 | Rooyen et al. ............. | 342/377 |
| 7,433,386 B2 * | 10/2008 | Lucidarme et al. .......... | 375/146 |
| 2004/0104844 A1 * | 6/2004 | Rooyen et al. ............. | 342/377 |
| 2005/0030228 A1 * | 2/2005 | Judd ...................... | 342/383 |
| 2005/0146470 A1 * | 7/2005 | Li et al. .................. | 343/702 |
| 2006/0111054 A1 * | 5/2006 | Pan et al. ................. | 455/101 |

OTHER PUBLICATIONS

Form PCT/IB/326, "PCT Notification Concerning Transmittal of International Preliminary Report on Patentability (Chapter 1 of the Patent Cooperation Treaty)," 1 pg.
Form PCT/IB/373, "PCT International Preliminary Report on Patentability," 1 pg.
Form PCT/ISA/237, "PCT Written Opinion of the International Searching Authority," 3 pgs.
Form PCT/IB/326, "PCT Notification Concerning Transmittal of International Preliminary Report on Patentability (Chapter 1 of the Patent Cooperation Treaty)," 1 pg, May 2, 2007.
Form PCT/IB/373, "PCT International Preliminary Report on Patentability," 1 pg, May 2, 2007.
Form PCT/ISA/237, "PCT Written Opinion of the International Searching Authority," 3 pgs, May 5, 2007.

* cited by examiner

*Primary Examiner*—Chieh M Fan
*Assistant Examiner*—Jaison Joseph

(57) ABSTRACT

Communication systems and methods are described in which multiple transmit signals are generated from an input stream or signal. The communication systems and methods, collectively referred to as antenna virtualization or virtual antenna systems, generate from each input stream multiple transmit signals that when driven into multiple antennas create a radiation pattern that effectively appears to originate from a single antenna. The communications operations include receiving at least one input stream. Multiple transmit signals are generated from the received input stream; the number of transmit signals generated is greater than the number of received input streams. Generation of the transmit signals involves transforming the input stream. The transforming includes applying one or more of a variable delay, a phase shift, and signal shaping to information of the input stream. The transmit signals are transmitted by a separate antenna of an antenna system.

30 Claims, 13 Drawing Sheets

ANTENNA VIRTUALIZATION IN COMMUNICATION SYSTEMS

RELATED APPLICATION

This application claims the benefit of U.S. patent application No. 60/709,589, filed Aug. 18, 2005.

TECHNICAL FIELD

The embodiments provided herein relate to signal processing.

BACKGROUND

Wireless digital communications systems are poised to offer a cost-effective alternative to cable and Digital Subscriber Line (DSL) technologies or data services. One example of wireless digital communications systems is the Worldwide Interoperability for Microwave Access technology, or so called "WiMAX" technology. The WiMAX technology is based on the IEEE 802.16e air interface standard and is a promising framework for broadband wireless applications. WiMAX has the potential to enable full internet and digital voice services for both fixed and mobile users.

The WiMAX network architecture includes a subscriber station (SS) that communicates with a base station (BTS) via a wireless link or interface. The BTS includes PHY and media access controller (MAC) functionality, where PHY functionality takes care of encoding and decoding between a pure digital domain and a modulation in the analog domain. WiMAX uses Orthogonal Frequency Division Multiplexing (OFDM) because of the robustness to multipath propagation offered by OFDM and the use of multiple antenna systems. Orthogonal frequency-division multiplexing (OFDM) is a modulation technique for transmission based upon the idea of frequency-division multiplexing (FDM) in which each frequency channel is modulated using a simpler modulation. In OFDM the frequencies and modulation of FDM are arranged to be orthogonal with each other which reduces or eliminates the interference between channels.

OFDM is based on the theory that because low-rate modulations (modulations with relatively long symbols compared to the channel time characteristics) are less sensitive to multipath, it is better to send multiple low rate streams in parallel rather than sending one high rate waveform. This is what OFDM is doing because in operation it divides the frequency spectrum in subbands small enough so that the channel effects are constant (flat) over a given subband. A conventional modulation scheme (e.g. BPSK, QPSK, M-QAM, etc.) is then used to send information over the subband, and the fast changing effects of the channel (multipath) are significantly reduced or eliminated as they are now occurring during the transmission of a single symbol and are thus treated as flat fading at the receiver.

WiMAX realizes OFDM along with use of multiple antennas. The multiple antenna systems used in WiMAX include the use of multiple transmit and multiple receive antennas to provide a multiple-input multiple-output (MIMO) system. The MIMO system is a multi-antenna communication system that makes significant increases in throughput and range possible at the same bandwidth and same overall transmit power expenditure. In general, MIMO technology increases the spectral efficiency of a wireless communication system. Wireless MIMO communication exploits phenomena such as multipath propagation to increase data throughput and range, or reduce bit error rates, rather than attempting to eliminate effects of multipath propagation as traditional SISO (Single-Input Single-Output) communication systems seek to do. MIMO multiplies the point-to-point spectral efficiency by using multiple antennas and radio frequency (RF) chains at the BTS and the SS. MIMO achieves a multiplicative increase in throughput relative to SISO systems by carefully coding the transmitted signal across antennas, OFDM symbols, and frequency tones; this increase in throughput is generally realized without impact on system bandwidth or transmit power.

It has thus been shown that the channel capacity (a theoretical upper bound on system throughput) for a MIMO system is increased as the number of antennas is increased, proportional to the minimum number of transmit and receive antennas. The transmit side of typical MIMO systems uses multiple transmit antennas, while receivers can include single or multiple antennas. In a multiple antenna transmit system, the transmitter typically sends different signals from each transmit antenna, and these signals are referred to as streams.

In a conventional MIMO system the number of transmit signals or streams is equal to the number of antennas, however in some cases the number of transmit antennas used is greater than the number of transmit streams. In such systems there is consequently a need to make "M" real antennas appear as "N" virtual antennas (N<M) with each virtual antenna driven by one transmit stream. The virtual antenna must effectively behave like a real antenna and should reasonably cover the angular pattern of the real antenna. The advantages of virtualization include but are not limited to improved diversity in the link and lower power amplifier rating (but with larger number of antennas).

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

DETAILED DESCRIPTION

Figure 1:
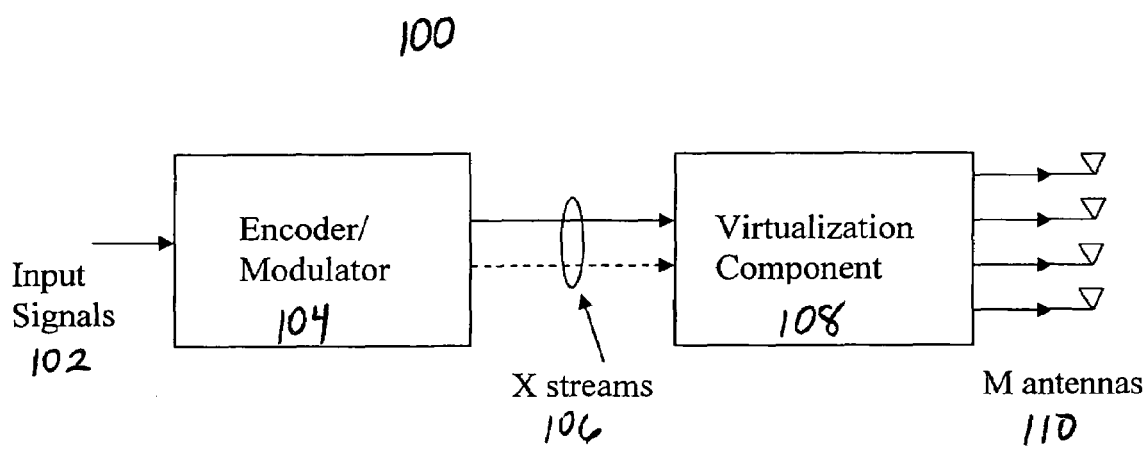
FIG. 1 is a block diagram of a communication system that includes a virtualization component, under an embodiment.

Communication systems and methods are described herein in which multiple transmit signals are generated from an input stream or signal. The communication systems and methods described herein, collectively referred to as antenna virtualization or a virtual antenna system, generate from each input stream multiple transmit signals that when driven into multiple antennas create a radiation pattern that effectively appears to originate from a single antenna. The communications operations include receiving at least one input stream. The input stream includes communication signals but is not so limited. Multiple transmit signals are generated from the received input stream; the number of transmit signals generated is greater than the number of received input streams. Generation of the transmit signals involves transforming the input stream. The transforming includes applying one or more of a variable delay, a phase shift, and signal shaping to information of the input stream. The variable delay, phase shift, and signal shaping transformations are described in detail below. The transmit signals are transmitted by a separate or respective antenna of a system of antennas.

Virtualization as used herein is transmitting from multiple antennas in such a way as the resulting transmissions appear as transmission effectively from a single antenna. The virtualization system described herein, also referred to as the virtual antenna system, thus operates or configures a number M of antennas so that the antennas appear as another number N of antennas. The number N of antennas is relatively smaller than the number M in an embodiment. The virtualization described herein provides link diversity and relatively more efficient use of power amplifier.

The virtual antenna system provides diversity, which results in a more reliable communication link. The diversity is realized because the virtual antenna system sweeps a transmission parameter such as signal strength or polarization angle as a function of the frequency as described herein. This increases the likelihood that signal energy is received by a device in some region of the device receiver spectrum. This diversity thus decreases the chance of complete communication link failure in the event frequency flat fade or a polarization mismatch. The multiple antennas of the virtual antenna system also allows for the use of multiple smaller rated power amplifiers (e.g. a virtualized antennas system transmitting a total of 40 watts with four (4) antennas using a 10 watt power amplifier in each of the four antenna signal paths, where a typical single-antenna system requires a 40 watt power amplifier in the signal path).

In the following description, numerous specific details are introduced to provide a thorough understanding of, and enabling description for, embodiments of the antenna virtualization. One skilled in the relevant art, however, will recognize that the antenna virtualization can be practiced without one or more of the specific details, or with other components, systems, etc. In other instances, well-known structures or operations are not shown, or are not described in detail, to avoid obscuring aspects of the antenna virtualization.

Various signal processing operations are described below. These operations include, for example, but are not limited to, null operations, Cyclic Delay Diversity (CDD) operations, and Amplitude Shaping (AS) operations. Each of these signal processing operations is described below.

A null operation is an operation that does not transform the input signal. The null operation also does not perform filtering of the input signal.

The CDD operation shifts the signal in the time domain by a delay $\delta$ and/or equivalently, in the frequency domain, performs a progressive phase shift of OFDM tones. In the time domain, the CDD results in a cyclic rotation of signal data by shifting the symbols of the signal or waveform by a pre-specified unit of time.

The equivalent of cyclic delay can be obtained by a phase shift of the OFDM tones via $$\exp(-j2\pi k\delta/N),$$

where k represents the tone index and N represents the number of the tones (i.e. the size of the Fast Fourier Transform (FFT)). The delay $\delta$ can be variable for different CDD blocks, and can have positive and negative values, but is not so limited.

The diversity provided by CDD can be best understood by studying the embodiment of applying a phase ramp to one of the input signals in a two-antenna system. Application of the phase ramp to one transmit signal results in the two antennas forming a "beam" that sweeps across the band of interest as a function of frequency. The phase ramp can be positive or negative in slope, can have any value of slope, and is not limited to a positive linear ramp. For example, the transmitted signal ramps or sweeps from low frequency to high frequency. As another example, the transmitted signal ramps or sweeps from high frequency to low frequency. The use of CDD thus increases the probability that a mobile device will receive the transmitted signal because the energy of the transmitted signal is swept across a band of frequencies as a function of angle. This makes the channel frequency selective at each angle as against a possibly original frequency flat channel fading that may be present. The frequency selectivity helps improve link diversity.

The amplitude shaping operations include a first amplitude shaping operation, referred to herein as Amplitude Shaping 1 (AS1). The AS1 operation shapes the amplitude of the OFDM tones according to a certain function. Amplitude shaping is generally associated with use of cross polarized antennas but is not limited to antennas having a cross polarized configuration. Pairs of amplitude shapes (functions) are defined as $$f_1(k) \text{ and } f_2(k),$$

where k represents a tone index. The shapes or functions are chosen such that $$f_1(k)^2 + f_2(k)^2 = 1, \forall k=1\ldots N.$$

For example, linear functions can be used like $$f_1(k) = \sqrt{k/N} \text{ and } f_2(k) = \sqrt{1-k/N}.$$

Another option includes the use of sinusoidal functions, that is, $$f_1(k) = \sin(\pi k/2N) \text{ and } f_2(k) = \cos(\pi k/2N).$$

Other optional function pairs can also be used in one or more alternative embodiments. While the sum of the shapes or functions can equal the value one (1), the embodiments herein are not limited to a sum equaling one (1) or any other particular value.

The amplitude shaping operations also include a second amplitude shaping operation, referred to herein as Amplitude Shaping 2 (AS2). The AS2 operation shapes the amplitude of the OFDM tones according to a certain complementary function (with respect to the AS1 operation). Pairs of amplitude shapes (functions) are defined as, $$f_1(k) \text{ and } f_2(k),$$

where k represents the tone index. The functions are again chosen such that $$f_1(k)^2 + f_2(k)^2 = 1, \forall k = 1 \ldots N.$$

For example, linear functions can be used like $$f_1(k) = \sqrt{1-k/N} \text{ and } f_2(k) = \sqrt{k/N}.$$

Another option includes the use of sinusoidal functions, that is, $$f_1(k) = \cos(\pi k/2N) \text{ and } f_2(k) = \sin(\pi k/2N).$$

As described above, while the sum of the shapes or functions can equal the value one (1), the embodiments herein are not limited to a sum equaling one (1) or any other particular value.

The diversity provided by an embodiment using amplitude shaping in conjunction with cross polarized antennas therefore is generally a result of variations in the polarization of a transmitted signal across frequencies of the band of interest as a function of frequency. Amplitude shaping of an embodiment is used in combination with polarized antennas, but can be used with other types of antennas. Polarization is the property of electromagnetic waves that describes the direction of transverse electric field of the waves. More generally, the polarization of a transverse wave describes the direction of oscillation in the plane perpendicular to the direction of travel. Antenna polarization refers to the orientation of the electric field (E-plane) of the radio wave with respect to the Earth's surface and is determined by the physical structure of the antenna and by its orientation.

In an embodiment, complementary amplitude shaping is applied to each of multiple signals that are coupled to cross-polar antennas. Using amplitude shaping, a two-antenna transmitter for example applies amplitude shaping (e.g. AS1) to a signal to form a first transmit signal, and transmits the first transmit signal with an antenna having a first polarization. Likewise, the transmitter applies a complementary amplitude shaping (e.g. AS2) to the signal to form a second transmit signal, and transmits the second transmit signal with an antenna having a second polarization. Application of the amplitude shaping of an embodiment therefore forms a transmitted signal that sweeps or "twists" its signal polarization across the band of interest as a function of frequency. Therefore, for example, the polarization of the transmitted signal varies from a polarization of −45 degrees at the low frequency end of the band of interest to a polarization of +45 degrees at the high frequency end of the band of interest. The varied polarization therefore increases the probability of a match between the receive antenna polarization and the transmit signal polarization. The use of amplitude shaping thus increases the probability that a mobile device will receive the transmitted signal, regardless of receive antenna polarization, because the polarization of the transmitted signal is varied across a band of frequencies instead of being fixed at a pre-specified polarization.

The antenna virtualization of an embodiment generally virtualizes M physical antennas into N virtual antennas. FIG. 1 is a block diagram of a communication system 100 that includes a virtualization component 108, under an embodiment. The virtualization component 108 is also referred to as a virtual antenna system. The communication system of an embodiment can be used in a WiMAX system and/or other wireless digital communications systems but is not so limited. The communication system of this example is a transmitter, but is not limited to being a transmitter. The virtualization component 108 is coupled to a number M of physical antennas (collectively referred to as physical antennas 110), where M represents any number of physical antennas 110. While four (4) antennas as shown in this example system 100, the embodiments described herein are not limited to this or any other number of physical antennas 110. The virtualization component 108 is also coupled to an encoder/modulator 104 of the host communication system 100. The encoder/modulator 104 is an OFDM modulator, but is not so limited. The coupling between the virtualization component 108 and the encoder/modulator 104 of an embodiment includes a number X of input streams or signals. The encoder/modulator 104 receives input signals 102 from one or more other components (not shown) of the host communication system 100. The virtualization component uses numerous techniques to virtualize M physical antennas 110 into N virtual antennas as described below. The number N of virtual antennas is generally less than the number M of physical antennas 110 but the embodiment is not so limited.

The antenna virtualization of various embodiments uses various combinations of the null, CDD, AS1, and AS2 signal processing operations described above. Examples of communication systems realizing antenna virtualization through null, CDD, and amplitude shaping are described below.

Figure 2:
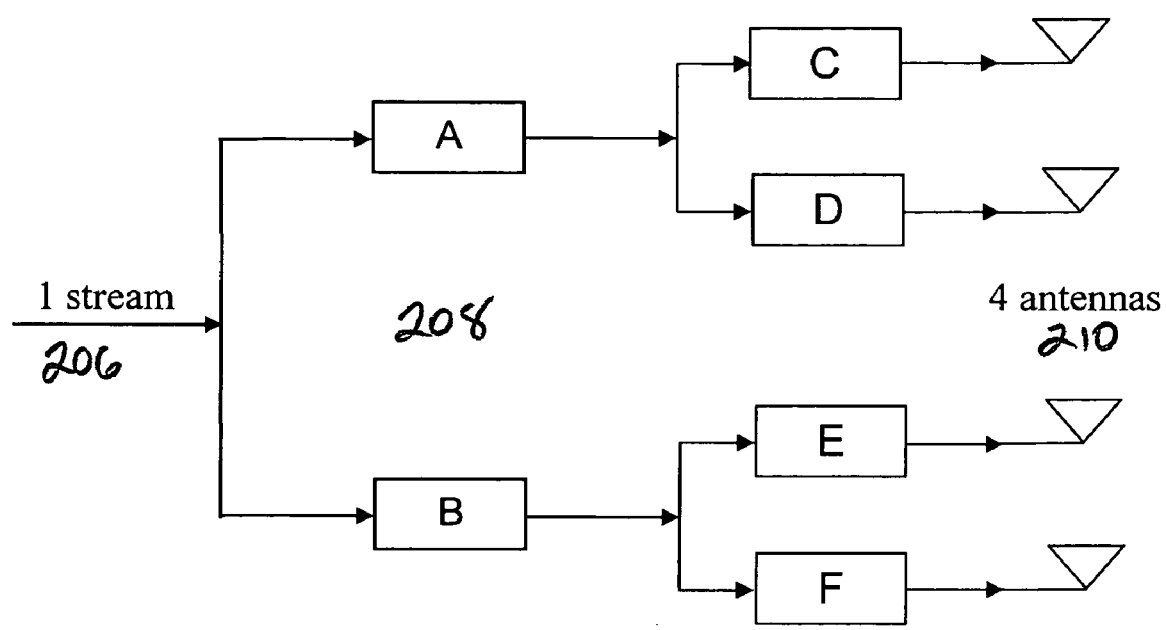
FIG. 2 is a block diagram of a virtualization component that virtualizes four (4) physical antennas into a number N of virtual antennas, under an embodiment.

The antenna virtualization of an embodiment virtualizes four (4) physical antennas into a number N of virtual antennas (N less than four (4)). FIG. 2 is a block diagram of a virtualization component 208 that virtualizes four (4) physical antennas 210 into a number N of virtual antennas (N less than four (4)), under an embodiment. The virtualization component 208 can be used in a communication transmitter for example, but is not so limited. The virtualization component 208 includes signal processing components or circuitry A-F that virtualize the four (4) physical antennas 210 into a number N of virtual antennas through various combinations of the null, CDD, AS1, and AS2 signal processing operations.

The input stream or driving signal 206 is coupled to the inputs of each of processing components A and B. The output of processing component A is coupled to the inputs of each of processing components C and D. The output of processing component C is coupled to a first physical antenna, and the output of processing component D is coupled to a second physical antenna. The output of processing component B is coupled to the inputs of each of processing components E and F. The output of processing component E is coupled to a third physical antenna, and the output of processing component F is coupled to a fourth physical antenna. Each of processing components A-F is applying one of the null, CDD, AS1, and AS2 signal processing operations to the respective input signal. Other signal processing operations can be performed to signals at any point in this representative communication system as appropriate to the type of communication system and/or signal. The set of physical antennas coupled to each set of processing components C and D and each set of processing components E and F can include cross-polar antennas but are not limited to cross-polar antennas.

Figure 3A:
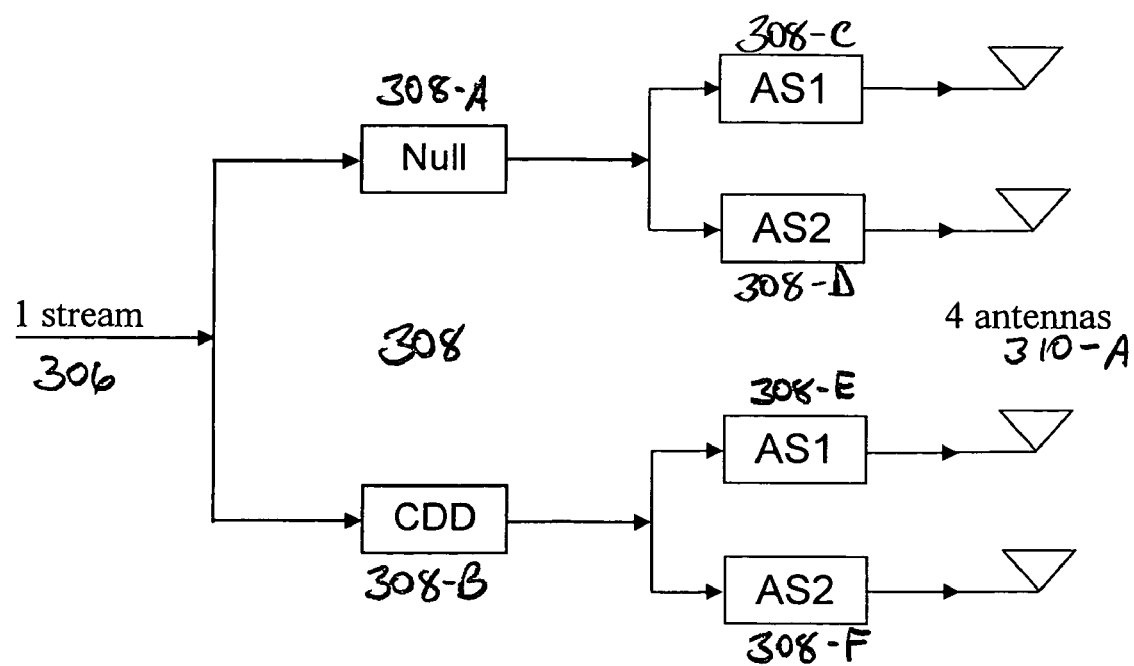
FIG. 3A is a block diagram of a virtualization component that virtualizes four (4) physical antennas into a number N of virtual antennas, under an alternative embodiment.

The antenna virtualization of a more specific embodiment virtualizes four (4) physical antennas into a number N of virtual antennas (N less than four (4)). FIG. 3A is a block diagram of a virtualization component 308 that virtualizes four (4) physical antennas 310 into a number N of virtual antennas (N less than four (4)), under an embodiment. The virtualization component 308 can be used in a communication transmitter for example, but is not so limited. The virtualization component 308 includes signal processing components or circuitry 308A-F that virtualize the four (4) physical antennas 310 into a number N of virtual antennas (N less than four (4)) through various combinations of the null, CDD, AS1, and AS2 signal processing operations.

The input stream or driving signal 306 is coupled to the input of processing component 308-A. Processing component 308-A applies the null signal processing operation to the input signal, but is not so limited. The output of processing component 308-A is coupled to the inputs of each of processing components 308-C and 308-D. Processing component 308-C applies the AS1 signal processing operation to the input signal and processing component 308-D applies the AS1 signal processing operation to the input signal, but the embodiment is not so limited. The output of processing component 308-C is coupled to a first physical antenna, and the output of processing component 308-D is coupled to a second physical antenna. The physical antennas coupled to each of processing components 308-C and 308D can include cross-polar antennas but are not limited to cross-polar antennas.

The input stream or driving signal 306 is also coupled to the input of processing component 308-B. Processing component 308-B applies the CDD signal processing operation to the input signal, but is not so limited. The output of processing component 308-B is coupled to the inputs of each of processing components 308-E and 308-F. Processing component 308-E applies the AS1 signal processing operation to the input signal and processing component 308-F applies the AS2 signal processing operation to the input signal, but the embodiment is not so limited. The output of processing component 308-E is coupled to a third physical antenna, and the output of processing component 308-F is coupled to a fourth physical antenna. Other signal processing operations can be performed to signals at any point in this representative communication system as appropriate to the type of communication system and/or signal.

Figure 3B:
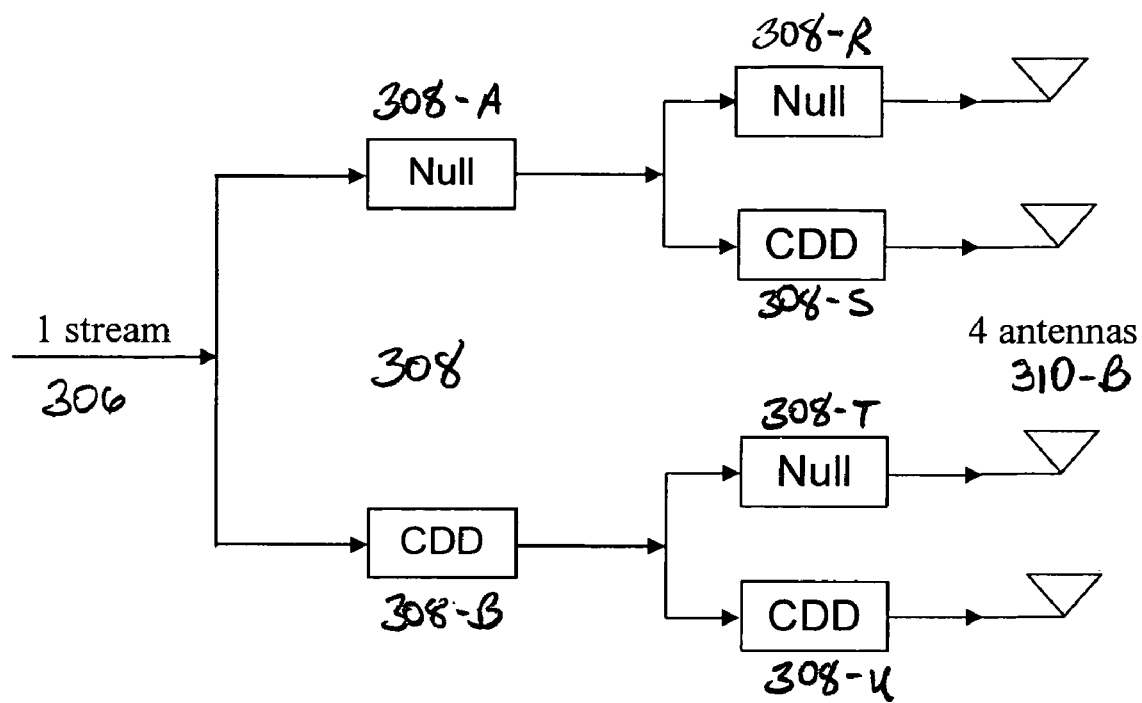
FIG. 3B is a block diagram of a virtualization component that virtualizes four (4) physical antennas into a number N of virtual antennas, under another alternative embodiment.

FIG. 3B is a block diagram of a virtualization component 308 that virtualizes four (4) physical antennas 310-B into a number N of virtual antennas (N less than four (4)), under an alternative embodiment. The virtualization component 308 can be used in a communication transmitter for example, but is not so limited. The virtualization component 308 includes signal processing components or circuitry 308A-B and 308R-U that virtualize the four (4) physical antennas 310-B into a number N of virtual antennas (N less than four (4)) through various combinations of the null and CDD signal processing operations.

The input stream or driving signal 306 is coupled to the input of processing component 308-A. Processing component 308-A applies the null signal processing operation to the input signal, but is not so limited. The output of processing component 308-A is coupled to the inputs of each of processing components 308-R and 308-S. Processing component 308-R applies the null signal processing operation to the input signal and processing component 308-S applies the CDD signal processing operation to the input signal, but the embodiment is not so limited. The output of processing component 308-R is coupled to a first physical antenna, and the output of processing component 308-S is coupled to a second physical antenna.

The input stream or driving signal 306 is also coupled to the input of processing component 308-B. Processing component 308-B applies the CDD signal processing operation to the input signal, but is not so limited. The output of processing component 308-B is coupled to the inputs of each of processing components 308-T and 308-U. Processing component 308-T applies the null signal processing operation to the input signal and processing component 308-U applies the CDD signal processing operation to the input signal, but the embodiment is not so limited. The output of processing component 308-T is coupled to a third physical antenna, and the output of processing component 308-U is coupled to a fourth physical antenna. Other signal processing operations can be performed to signals at any point in this representative communication system as appropriate to the type of communication system and/or signal.

As described above, the delay $\delta$ can be variable for different CDD blocks, and can have positive and negative values, but is not so limited. A configuration of virtualization component 308 provides an example of the use of variable delay $\delta$ among different CDD components. In an embodiment, processing component 308-B applies the CDD signal processing operation to the input signal using a first value of delay $\delta$ (delay $\delta 1$). Processing components 308-S and 308-U also apply the CDD signal processing operation to the input signal but, in contrast to processing component 308-B use a second value of delay $\delta$ (delay $\delta 2$), where the value of delay $\delta 1$ is different than the value of delay $\delta 2$. A more specific example uses a value for delay $\delta 1$ that is approximately twice the delay of delay $\delta 2$, but these values are only examples and the embodiment is not limited to this configuration.

Figure 4A:
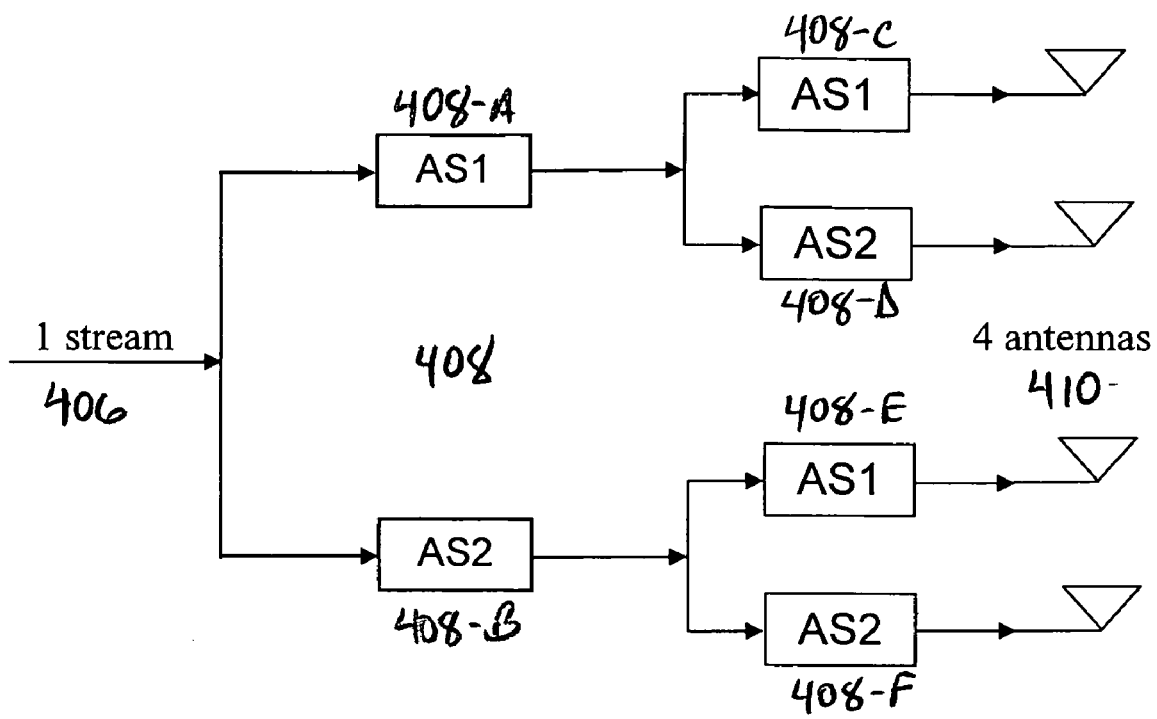
FIG. 4A is a block diagram of a virtualization component that virtualizes four (4) physical antennas into a number N of virtual antennas, under yet another alternative embodiment.

The antenna virtualization of another more specific example embodiment virtualizes four (4) physical antennas into a number N of virtual antennas (N less than four (4)). FIG. 4A is a block diagram of a virtualization component 408 that virtualizes four (4) physical antennas 410 into a number N of virtual antennas (N less than four (4)), under an embodiment. The virtualization component 408 can be used in a communication transmitter for example, but is not so limited. The virtualization component 408 includes signal processing components or circuitry 408A-F that virtualize the four (4) physical antennas 410 into a number N of virtual antennas (N less than four (4)) through various combinations of the null, CDD, AS1, and AS2 signal processing operations.

The input stream or driving signal 406 is coupled to the input of processing component 408-A. Processing component 408-A applies the AS1 signal processing operation to the input signal, but is not so limited. The output of processing component 408-A is coupled to the inputs of each of processing components 408-C and 408-D. Processing component 408-C applies the AS1 signal processing operation while processing component 408-D applies the AS2 signal processing operation to the input signal, but are not so limited. The output of processing component 408-C is coupled to a first physical antenna, and the output of processing component 408-D is coupled to a second physical antenna.

The input stream or driving signal 406 is also coupled to the input of processing component 408-B. Processing component 408-B applies the AS2 signal processing operation to the input signal, but is not so limited. The output of processing component 408-B is coupled to the inputs of each of processing components 408-E and 408-F. Processing component 408-E applies the AS1 signal processing operation while processing component 408-F applies the AS2 signal processing operation to the input signal, but are not so limited. The output of processing component 408-E is coupled to a third physical antenna, and the output of processing component 408-F is coupled to a fourth physical antenna. Other signal processing operations can be performed to signals at any point in this representative communication system as appropriate to the type of communication system and/or signal.

Figure 4B:
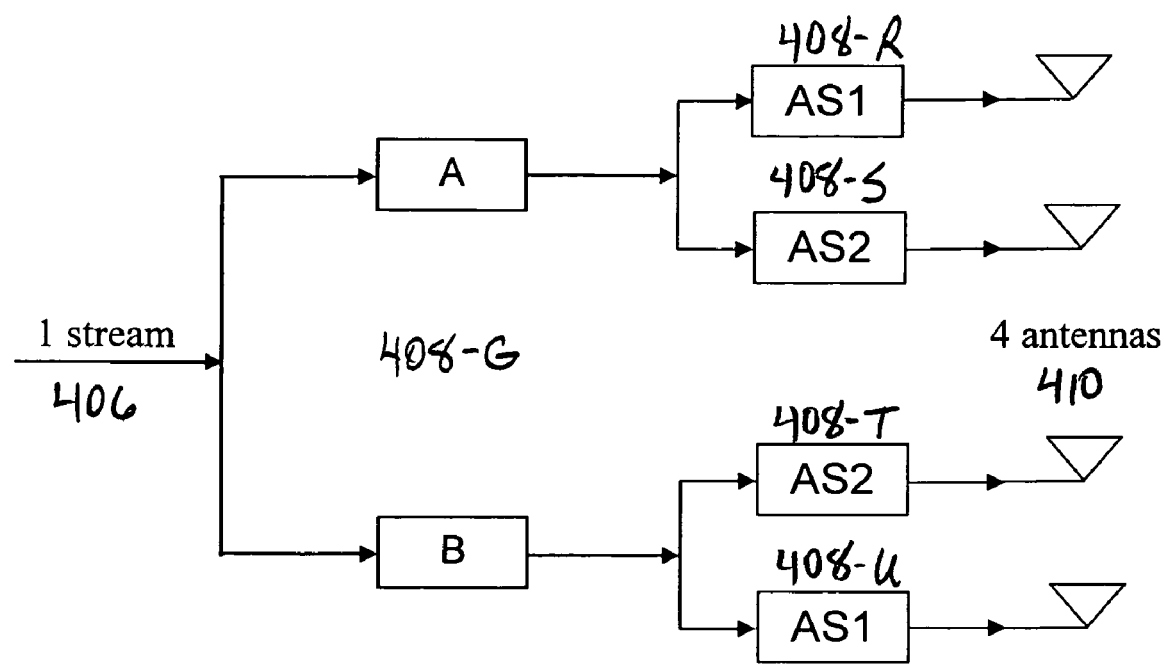
FIG. 4B is a block diagram of a virtualization component that virtualizes four (4) physical antennas into a number N of virtual antennas, under still another alternative embodiment.

The antenna virtualization of another more specific example embodiment virtualizes four (4) physical antennas into a number N of virtual antennas (N less than four (4)). FIG. 4B is a block diagram of a virtualization component 408-G that virtualizes four (4) physical antennas 410 into a number N of virtual antennas (N less than four (4)), under an embodiment. The virtualization component 408-G can be used in a communication transmitter for example, but is not so limited. The virtualization component 408-G includes signal processing components or circuitry A, B, and 408-R-U that virtualize the four (4) physical antennas 410 into a number N of virtual antennas (N less than four (4)) through various combinations of the signal processing operations.

The input stream or driving signal 406 is coupled to the input of processing components A and B. Processing components A and B each apply a pre-specified signal processing operation to the respective input signal. The output of processing component A is coupled to the inputs of each of processing components 408-R and 408-S. Processing component 408-R applies the AS1 signal processing operation while processing component 408-T applies the AS2 signal processing operation to the input signal, but are not so limited. The output of processing component 408-R is coupled to a first physical antenna, and the output of processing component 408-S is coupled to a second physical antenna.

The output of processing component B is coupled to the inputs of each of processing components 408-T and 408-U. Processing component 408-T applies the AS2 signal processing operation while processing component 408-U applies the AS1 signal processing operation to the input signal, but are not so limited. The output of processing component 408-T is coupled to a third physical antenna, and the output of processing component 408-U is coupled to a fourth physical antenna. Other signal processing operations can be performed to signals at any point in this representative communication system as appropriate to the type of communication system and/or signal.

Figure 5:
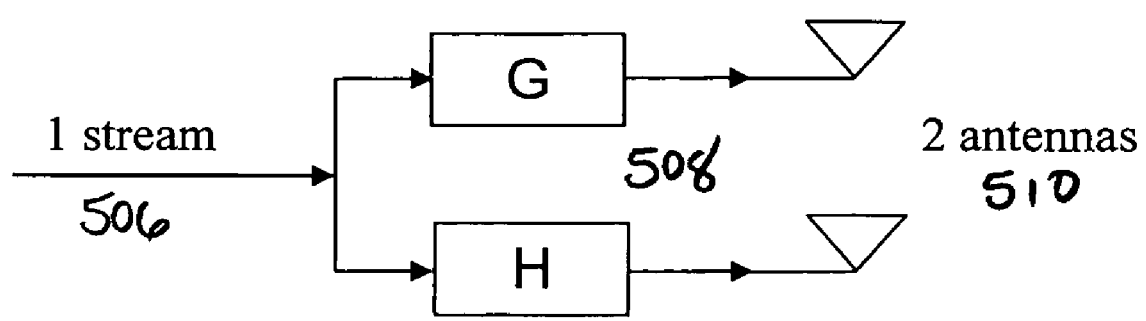
FIG. 5 is a block diagram of a virtualization component that virtualizes two (2) physical antennas into one (1) virtual antenna, under an embodiment.

As another example of the antenna virtualization of an embodiment, the antenna virtualization virtualizes two (2) physical antennas into one (1) virtual antenna. FIG. 5 is a block diagram of a virtualization component 508 that virtualizes two (2) physical antennas 510 into one (1) virtual antenna, under an embodiment. The virtualization component 508 can be used in or coupled to a communication transmitter for example, but is not so limited. The virtualization component 508 includes signal processing components or circuitry G and H that virtualize the two (2) physical antennas 510 into one (1) virtual antenna through various combinations of the null, CDD, AS1, and AS2 signal processing operations.

The input stream or driving signal 506 is coupled to the inputs of each of processing components G and H. The output of processing component G is coupled to a first physical antenna, and the output of processing component H is coupled to a second physical antenna. Each of processing components G and H is applying one of the null, CDD, AS1, and AS2 signal processing operations to the respective input signal. Other signal processing operations can be performed to signals at any point in this representative communication system as appropriate to the type of communication system and/or signal.

Figure 6:
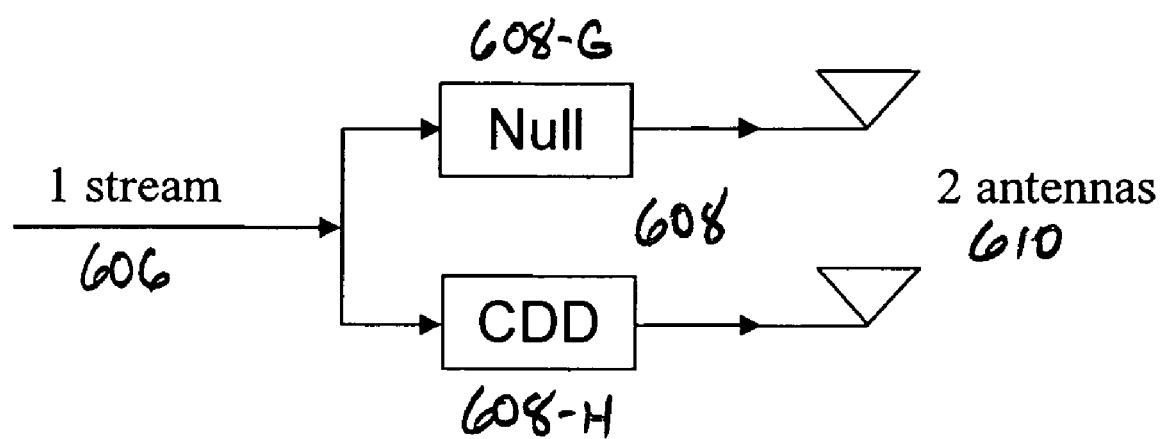
FIG. 6 is a block diagram of a virtualization component that virtualizes two (2) physical antennas into one (1) virtual antenna, under an alternative embodiment.

The antenna virtualization of a more specific embodiment virtualizes two (2) physical antennas into one (1) virtual antenna. FIG. 6 is a block diagram of a virtualization component 608 that virtualizes two (2) physical antennas 610 into one (1) virtual antenna, under an embodiment. The virtualization component 608 can be used in a communication transmitter for example, but is not so limited. The virtualization component 608 includes signal processing components or circuitry 608-G and 608-H that virtualize the two (2) physical antennas 610 into one (1) virtual antenna through various combinations of the null, CDD, AS1, and AS2 signal processing operations.

The input stream or driving signal 606 is coupled to the input of processing component 608-G. Processing component 608-G applies the null signal processing operation to the input signal, but is not so limited. The output of processing component 608-G is coupled to a first physical antenna.

The input stream or driving signal 606 is coupled to the input of processing component 608-H. Processing component 608-H applies the CDD signal processing operation to the input signal, but is not so limited. The output of processing component 608-H is coupled to a second physical antenna. Other signal processing operations can be performed to signals at any point in this representative communication system as appropriate to the type of communication system and/or signal.

Figure 7:
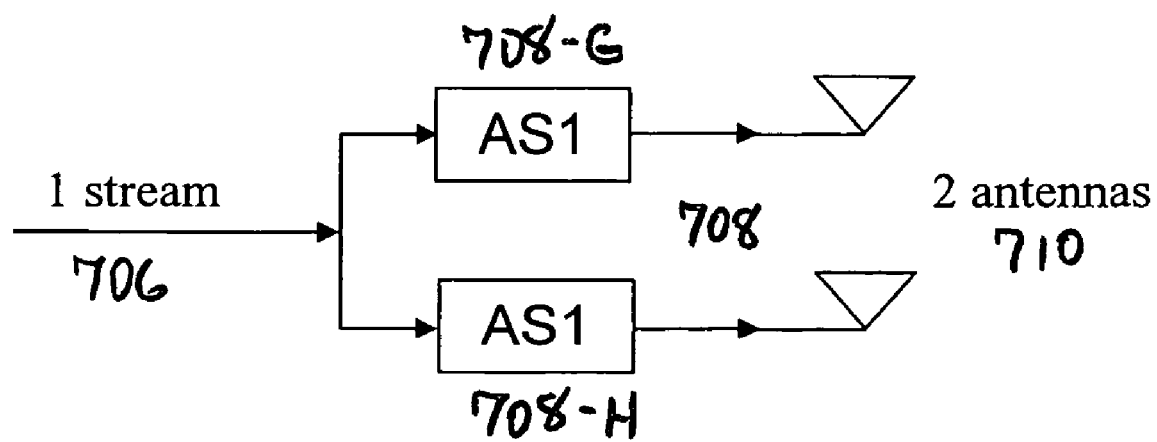
FIG. 7 is a block diagram of a virtualization component that virtualizes two (2) physical antennas into one (1) virtual antenna, under another alternative embodiment.

The antenna virtualization of another more specific embodiment virtualizes two (2) physical antennas into one (1) virtual antenna. FIG. 7 is a block diagram of a virtualization component 708 that virtualizes two (2) physical antennas 710 into one (1) virtual antenna, under an embodiment. The virtualization component 708 can be used in a communication transmitter for example, but is not so limited. The virtualization component 708 includes signal processing components or circuitry 708-G and 708-H that virtualize the two (2) physical antennas 710 into one (1) virtual antenna through various combinations of the null, CDD, AS1, and AS2 signal processing operations.

The input stream or driving signal 706 is coupled to the input of processing component 708-G. Processing component 708-G applies the AS1 signal processing operation to the input signal, but is not so limited. The output of processing component 708-G is coupled to a first physical antenna.

The input stream or driving signal 706 is coupled to the input of processing component 708-H. Processing component 708-H applies the AS1 signal processing operation to the input signal, but is not so limited. The output of processing component 708-H is coupled to a second physical antenna. Other signal processing operations can be performed to signals at any point in this representative communication system as appropriate to the type of communication system and/or signal.

Figure 8:
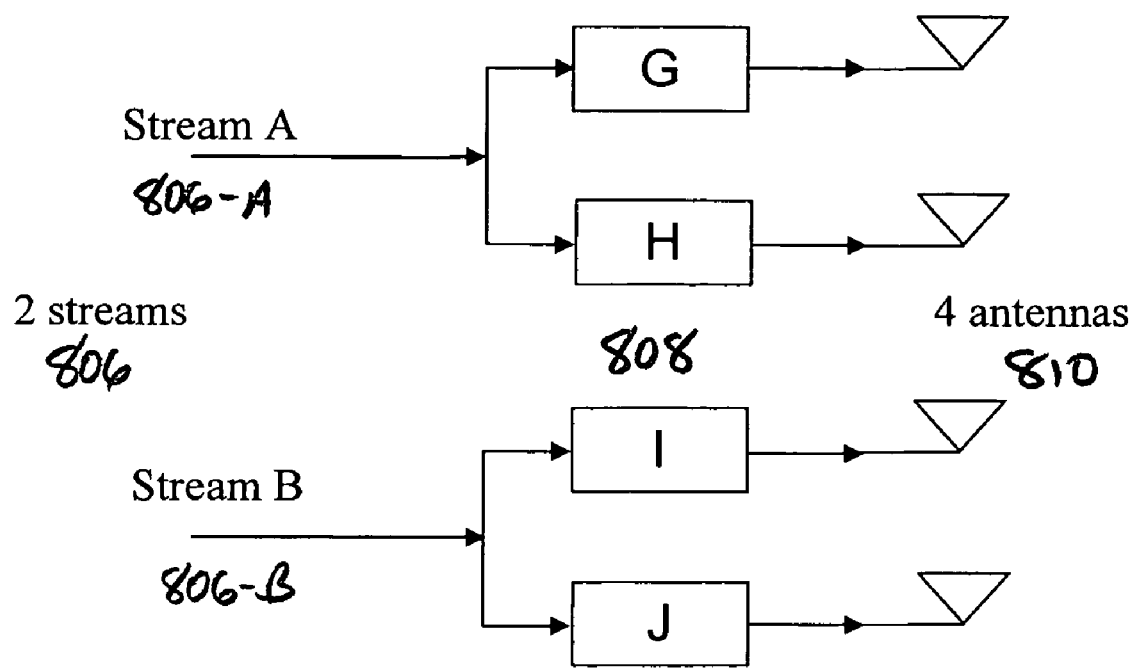
FIG. 8 is a block diagram of a virtualization component that virtualizes four (4) physical antennas into a number N of virtual antennas, under an embodiment.

The antenna virtualization of an embodiment virtualizes four (4) physical antennas into a number N of virtual antennas (N less than four (4)). FIG. 8 is a block diagram of a virtualization component 808 that virtualizes four (4) physical antennas 810 into a number N of virtual antennas (N less than four (4)), under an embodiment. The virtualization component 808 can be used in a communication transmitter for example, but is not so limited. The virtualization component 808 includes signal processing components or circuitry G-J that virtualize the four (4) physical antennas 810 into a number N of virtual antennas (N less than four (4)) through various combinations of the null, CDD, AS1, and AS2 signal processing operations.

A first input stream or driving signal 806-A is coupled to the inputs of each of processing components G and H. The output of processing component G is coupled to a first physical antenna, and the output of processing component H is coupled to a second physical antenna. A second input stream or driving signal 806-B is coupled to the inputs of each of processing components I and J. The output of processing component I is coupled to a third physical antenna, and the output of processing component J is coupled to a fourth physical antenna. Each of processing components G-J is applying one of the null, CDD, AS1, and AS2 signal processing operations to the respective input signal. Other signal processing operations can be performed to signals at any point in this representative communication system as appropriate to the type of communication system and/or signal.

Figure 9:
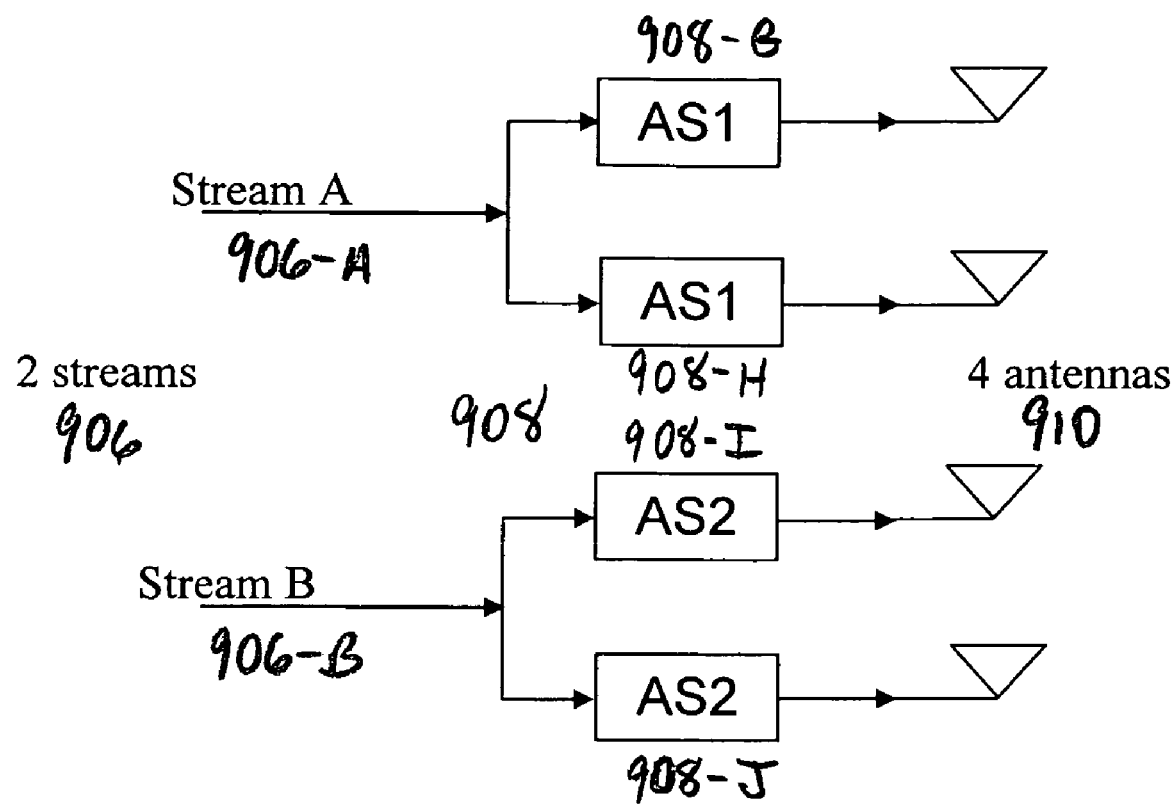
FIG. 9 is a block diagram of a virtualization component that virtualizes four (4) physical antennas into a number N of virtual antennas, under an alternative embodiment.

The antenna virtualization of a more specific embodiment virtualizes four (4) physical antennas into a number N of virtual antennas (N less than four (4)). FIG. 9 is a block diagram of a virtualization component 908 that virtualizes four (4) physical antennas 910 into a number N of virtual antennas (N less than four (4)), under an embodiment. The virtualization component 908 can be used in a communication transmitter for example, but is not so limited. The virtualization component 908 includes signal processing components or circuitry 908G-J that virtualize the four (4) physical antennas 910 into a number N of virtual antennas (N less than four (4)) through various combinations of the null, CDD, AS1, and AS2 signal processing operations.

The first input stream or driving signal 906-A is coupled to the inputs of each of processing component 908-G and processing component 908-H. Processing components 908-G and 908-H each apply the AS1 signal processing operation to the input signal, but are not so limited. The output of processing component 908-G is coupled to a first physical antenna, and the output of processing component 908-H is coupled to a second physical antenna.

The second input stream or driving signal 906-B is coupled to the inputs of each of processing component 908-I and processing component 908-J. Processing components 908-I and 908-J each apply the AS2 signal processing operation to the input signal, but are not so limited. The output of processing component 908-I is coupled to a third physical antenna, and the output of processing component 908-J is coupled to a fourth physical antenna. Other signal processing operations can be performed to signals at any point in this representative communication system as appropriate to the type of communication system and/or signal.

Figure 10:
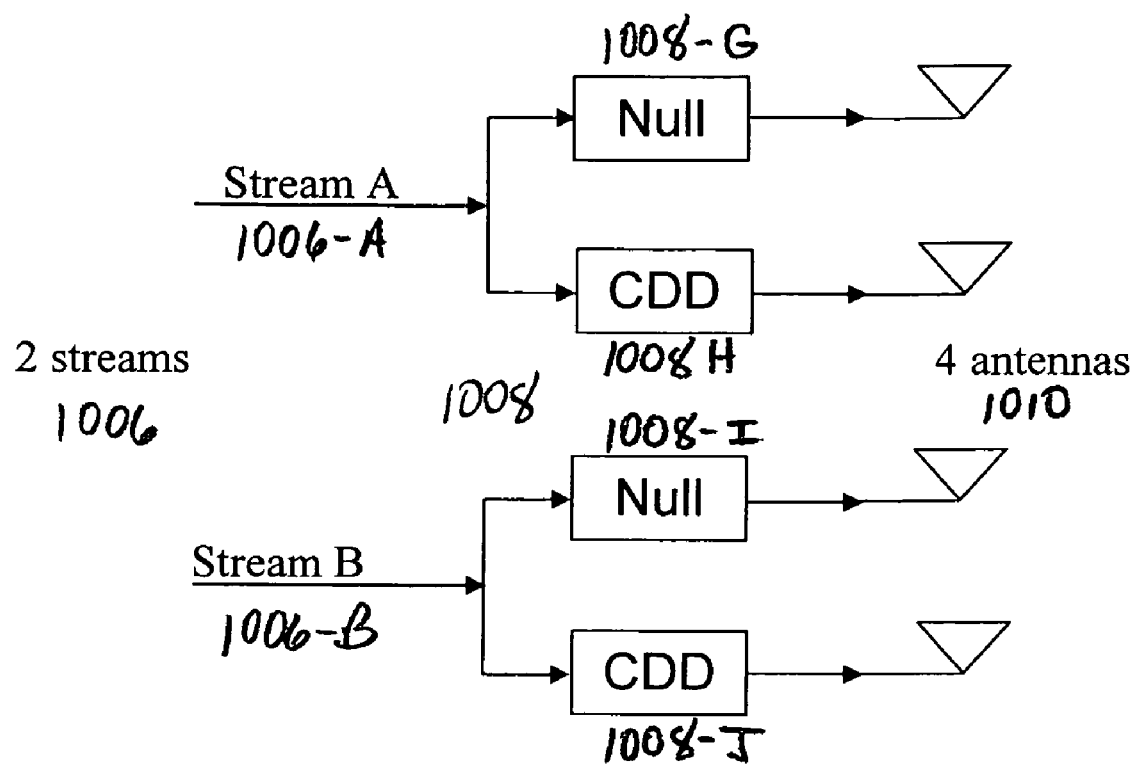
FIG. 10 is a block diagram of a virtualization component that virtualizes four (4) physical antennas into a number N of virtual antennas, under another alternative embodiment.

The antenna virtualization of another more specific embodiment virtualizes four (4) physical antennas into a number N of virtual antennas (N less than four (4)). FIG. 10 is a block diagram of a virtualization component 1008 that virtualizes four (4) physical antennas 1010 into a number N of virtual antennas (N less than four (4)), under an embodiment. The virtualization component 1008 can be used in a communication transmitter for example, but is not so limited. The virtualization component 1008 includes signal processing components or circuitry 1008G-J that virtualize the four (4) physical antennas 1010 into a number N of virtual antennas (N less than four (4)) through various combinations of the null, CDD, AS1, and AS2 signal processing operations.

The first input stream or driving signal 1006-A is coupled to the inputs of each of processing component 1008-G and processing component 1008-H. Processing component 1008-G applies the null signal processing operation to the input signal, but is not so limited. The output of processing component 1008-G is coupled to a first physical antenna. Processing component 1008-H applies the CDD signal processing operation to the input signal, but is not so limited. The output of processing component 1008-H is coupled to a second physical antenna.

The second input stream or driving signal 1006-B is coupled to the inputs of each of processing component 1008-I and processing component 1008-J. Processing component 1008-I applies the null signal processing operation to the input signal, but is not so limited. The output of processing component 1008-I is coupled to a third physical antenna. Processing component 1008-J applies the CDD signal processing operation to the input signal, but is not so limited. The output of processing component 1008-J is coupled to a second physical antenna. Other signal processing operations can be performed to signals at any point in this representative communication system as appropriate to the type of communication system and/or signal.

The CDD operation, as described above, shifts the signal in the time domain by a delay δ and/or equivalently, in the frequency domain, performs a phase shift of OFDM tones. The phase shift of the OFDM tones is a phase shift of approximately $$\exp(-j2\pi k\delta/N),$$

where k represents the tone index and N represents the number of the tones (i.e. the size of the Fast Fourier Transform (FFT)). The delay δ of an embodiment is different for each of processing components 1008-H and 1008-J, but is not so limited.

Figure 11:
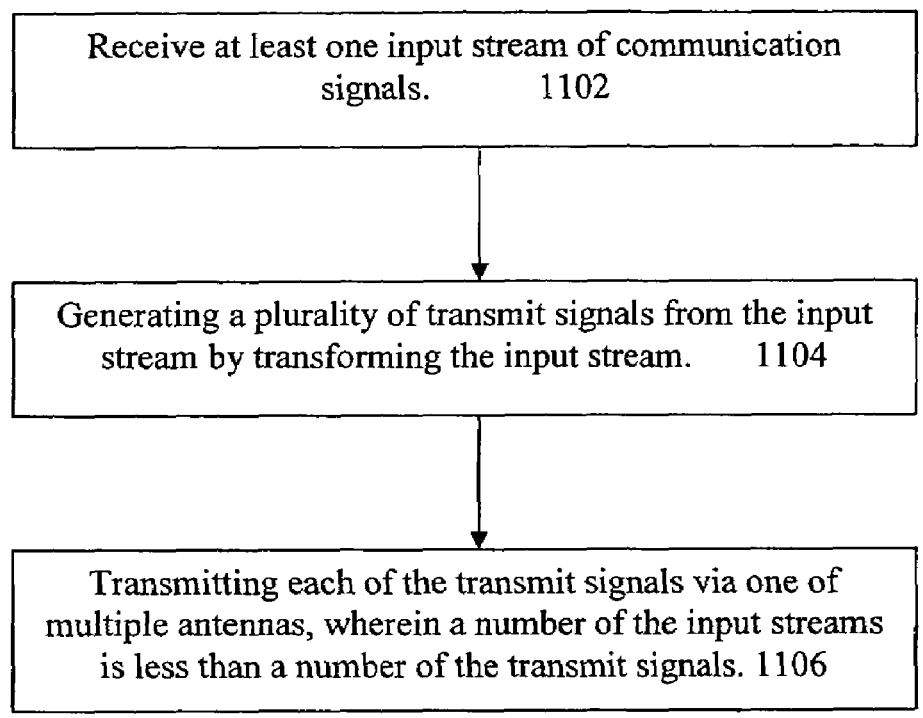
FIG. 11 is a flow diagram for communications with virtual antennas, under an embodiment.

FIG. 11 is a flow diagram for communications 1100 using virtual antennas, under an embodiment. The communications operations 1100 include receiving 1102 at least one input stream. The input stream includes communication signals but is not so limited. Multiple transmit signals are generated 1104 from the received input stream; the number of transmit signals generated 1104 is greater than the number of received input streams. Generation 1104 of the transmit signals involves transforming the input stream. The transforming includes applying one or more of a variable delay, a phase shift, and signal shaping to information of the input stream. The variable delay, phase shift, and signal shaping transformations are described in detail above. The transmit signals are provided 1106 to a separate or respective antenna of a system of antennas for transmission.

The antenna virtualization of an embodiment includes a communication system comprising a plurality of antennas. The system of an embodiment includes a virtualization component including a plurality of outputs coupled to the plurality of antennas. The virtualization component of an embodiment is coupled to at least one input stream from an encoder. The virtualization component of an embodiment is configured to generate a plurality of transmit signals from the at least one input stream by applying at least one signal transformation to the at least one input stream. Each one of the plurality of transmit signals of an embodiment is transmitted by a respective one of the plurality of antennas so that collective transmissions of the plurality of antennas form a radiation pattern that appears to originate from at least one virtual antenna. A number of the virtual antennas of an embodiment is fewer than a number of the plurality of antennas.

The at least one signal transformation of an embodiment varies at least one parameter of the at least one input stream.

The at least one parameter of an embodiment includes one or more of polarization angle, signal strength, phase, and symbol position.

The at least one signal transformation of an embodiment varies a polarization angle of the at least one input stream.

The at least one signal transformation of an embodiment varies a signal strength of the at least one input stream.

The at least one signal transformation of an embodiment applies a time domain shift to the at least one input stream.

The at least one signal transformation of an embodiment applies a progressive phase shift to the at least one input stream.

The at least one signal transformation of an embodiment applies a phase ramp to the at least one input stream. The phase ramp of an embodiment has one of a negative and positive slope.

The at least one signal transformation of an embodiment includes one or more of a null transformation, a cyclic delay diversity transformation, and at least one amplitude shaping transformation.

The at least one signal transformation of an embodiment includes applying a variable delay to the at least one input stream.

The at least one signal transformation of an embodiment includes applying a phase shift to the at least one input stream. The phase shift of an embodiment includes a phase shift of tones of the at least one input stream. The phase shift of an embodiment is approximately $$\exp(-j2\pi k\delta/N),$$

wherein k represents a tone index and N represents a number of the tones.

The at least one signal transformation of an embodiment includes shaping an amplitude of tones of the at least one input stream. The shaping of an embodiment includes shaping using a pair of amplitude functions. The shaping of an embodiment includes generating a first transmit signal by shaping the input stream using a first amplitude function, and generating a second transmit signal by shaping the input stream using a second amplitude function. The first transmit signal of an embodiment is transmitted using a first antenna and the second transmit signal is transmitted using a second antenna. The first antenna and the second antenna of an embodiment are cross-polar antennas. The pair of amplitude functions of an embodiment is one of linear functions and sinusoidal functions.

The pair of functions of an embodiment include functions $$f_1(k) \text{ and } f_2(k),$$

wherein k represents a tone index. The amplitude functions of an embodiment are selected such that $$f_1(k)^2 + f_2(k)^2 = 1, \forall k = 1 \ldots N.$$

The virtualization component of an embodiment comprises a first set of transformation components coupled to the at least one input stream. The virtualization component of an embodiment includes a second set of transformation components coupled to receive outputs of the first set of transformation components, wherein the second set of transformation components outputs the transmit signals. The first set of transformation components of an embodiment includes first and second transformers coupled to an input stream. The second transformer of an embodiment applies a variable delay to the input stream.

The second set of transformation components of an embodiment includes a third transformer coupled to an output of the first transformer. The third transformer of an embodiment outputs a first transmit signal to a first antenna. The second set of transformation components of an embodiment includes a fourth transformer coupled to an output of the first transformer. The fourth transformer of an embodiment outputs a second transmit signal to a second antenna. The second set of transformation components of an embodiment includes fifth transformer coupled to an output of the second transformer. The fifth transformer of an embodiment outputs a third transmit signal to a third antenna. The second set of transformation components of an embodiment includes a sixth transformer coupled to an output of the second transformer. The sixth transformer of an embodiment outputs a fourth transmit signal to a fourth antenna.

The third and fifth transformers of an embodiment apply a first amplitude shaping transformation to an input, and the fourth and sixth transformers apply a second amplitude shaping transformation to an input. The first transformer of an embodiment applies the first amplitude shaping transformation to the input stream and the second transformer applies the second amplitude shaping transformation to the input stream.

One or more of the second transformer, fourth transformer, and sixth transformer of an embodiment applies one or more of a progressive phase shift and a time domain shift to an input.

The first set of transformation components of an embodiment includes a first transformer that outputs a first transmit signal to a first antenna. The first set of transformation components of an embodiment includes a second transformer that outputs a second transmit signal to a second antenna. The second transformer of an embodiment applies a variable delay to the input stream. The virtualization component of an embodiment comprises a first set of transformation components coupled to first and second input streams.

The first set of transformation components of an embodiment includes a first transformer coupled to the first input stream. The first transformer of an embodiment outputs a first transmit signal to a first antenna. The first set of transformation components of an embodiment includes a second transformer coupled to the first input stream. The second transformer of an embodiment outputs a second transmit signal to a second antenna. The first set of transformation components of an embodiment includes a third transformer coupled to the second input stream. The third transformer of an embodiment outputs a third transmit signal to a third antenna. The first set of transformation components of an embodiment includes a fourth transformer coupled to the second input stream. The fourth transformer of an embodiment outputs a fourth transmit signal to a fourth antenna.

The first and second transformers of an embodiment apply a first amplitude shaping transformation to the first input stream, and the third and fourth transformers apply a second amplitude shaping transformation to the second input stream.

The plurality of antennas and the virtualization component of an embodiment are coupled to a base station in a wireless digital communications system.

The transmit signals of an embodiment are modulated using orthogonal frequency-division multiplexing (OFDM).

The virtualization component of an embodiment is on a computer chip and coupled to a processor.

The virtualization component of an embodiment is distributed on a computer chipset and coupled to a processor.

The antenna virtualization of an embodiment includes a method comprising receiving at least one input stream of communication signals. The method of an embodiment includes generating a plurality of transmit signals from the at least one input stream by transforming the at least one input stream. The transforming of an embodiment includes applying one or more of a variable delay, a phase shift, and signal shaping to information of the at least one input stream. The method of an embodiment includes transmitting each one of the plurality of transmit signals by a respective one of a plurality of antennas. Collective transmission of the plurality of transmit signals of an embodiment forms a radiation pattern that appears to originate from at least one virtual antenna. A number of the virtual antennas is fewer than a number of the plurality of antennas.

The transforming of the method of an embodiment varies at least one parameter of the at least one input stream. The at least one parameter of an embodiment includes one or more of polarization angle, signal strength, phase, and symbol position.

The transforming of the method of an embodiment varies a polarization angle of the at least one input stream.

The transforming of the method of an embodiment varies a signal strength of the at least one input stream.

The transforming of the method of an embodiment applies a time domain shift to the at least one input stream.

The transforming of the method of an embodiment applies a progressive phase shift to the at least one input stream.

The transforming of the method of an embodiment applies a phase ramp to the at least one input stream. The phase ramp of an embodiment has one of a negative and positive slope.

The phase shift of the method of an embodiment includes a phase shift of tones of the at least one input stream. The phase shift of an embodiment is approximately $$\exp(-j2\pi k\delta/N),$$

wherein k represents a tone index and N represents a number of the tones.

The signal shaping of the method of an embodiment includes shaping an amplitude of tones of the at least one input stream. The signal shaping of an embodiment includes shaping using a pair of amplitude functions. The shaping of an embodiment includes generating a first transmit signal by shaping the input stream using a first amplitude function, and generating a second transmit signal by shaping the input stream using a second amplitude function.

The transmitting of an embodiment includes transmitting the first transmit signal using a first antenna and transmitting the second transmit signal using a second antenna. The method of an embodiment includes configuring the first antenna and the second antenna as cross-polar antennas. The pair of amplitude functions of an embodiment is one of linear functions and sinusoidal functions. The pair of amplitude functions of an embodiment includes functions $$f_1(k) \text{ and } f_2(k),$$

wherein k represents a tone index. The amplitude functions of an embodiment are selected such that $$f_1(k)^2 + f_2(k)^2 = 1, \forall k=1\ldots N.$$

The transforming of the method of an embodiment includes a first transforming of the at least one input stream. The transforming of the method of an embodiment includes a second transforming applied to at least one signal output of the first transforming.

The second transforming of an embodiment outputs the transmit signals.

The first transforming of an embodiment includes a first transformation operation and a second transformation operation applied to an input stream. The second transformation operation of an embodiment applies the variable delay to the input stream.

The second transforming of an embodiment includes a third transformation operation that outputs a first transmit signal to a first antenna. The second transforming of an embodiment includes a fourth transformation operation that outputs a second transmit signal to a second antenna. The second transforming of an embodiment includes a fifth transformation operation that outputs a third transmit signal to a third antenna. The second transforming of an embodiment includes a sixth transformation operation that outputs a fourth transmit signal to a fourth antenna. The third and fifth transformation operations of an embodiment apply a first amplitude shaping to an output of the first transformation operation, and the fourth and sixth transformation operations apply a second amplitude shaping to an output of the second transformation operation. The first transformation operation of an embodiment applies the first amplitude shaping and the second transformation operation applies the second amplitude shaping. One or more of the second transformation, fourth transformation, and sixth transformation of an embodiment applies one or more of a progressive phase shift operation and a time domain shift operation to an input.

The first transforming of an embodiment includes a first transformation operation that outputs a first transmit signal to a first antenna. The first transforming of an embodiment includes a second transformation operation that outputs a second transmit signal to a second antenna. The second transformation operation of an embodiment includes applies the variable delay to the input stream.

The transforming of the method of an embodiment comprises a first transforming of first and second input streams. The first transforming of an embodiment includes a first transformation operation that outputs a first transmit signal to a first antenna. The first transforming of an embodiment includes a second transformation operation that outputs a second transmit signal to a second antenna. The first transforming of an embodiment includes a third transformation operation that outputs a third transmit signal to a third antenna. The first transforming of an embodiment includes a fourth transformation operation that outputs a fourth transmit signal to a fourth antenna. The first and second transformation operations of an embodiment apply a first amplitude shaping to the first input stream, and the third and fourth transformation operations apply a second amplitude shaping to the second input stream.

The transmit signals of an embodiment are orthogonal frequency-division multiplexing (OFDM) signals in a wireless digital communications system.

The antenna virtualization of an embodiment includes a method comprising: generating a plurality of communication signals from at least one signal stream. The generating of an embodiment applying one or more of a variable delay, a phase shift, and signal shaping to information of the at least one signal stream. The method of an embodiment includes transmitting each one of the plurality of communication signals by a respective one of a plurality of antennas. Collective transmission of the plurality of communication signals of an embodiment form a radiation pattern that appears to originate from at least one virtual antenna. A number of the virtual antennas of an embodiment is fewer than a number of the plurality of antennas.

The antenna virtualization of an embodiment includes a computer readable medium including executable instructions which, when executed in a processing system, provide a communications system that transmits signals by receiving at least one input stream of communication signals. The instructions of an embodiment when executed generate a plurality of transmit signals from the at least one input stream by transforming the at least one input stream. The transforming of an embodiment includes applying one or more of a variable delay, a phase shift, and signal shaping to information of the at least one input stream. The instructions of an embodiment when executed transmit each one of the plurality of transmit signals by a respective one of a plurality of antennas. A number of the at least one input streams of an embodiment is less than a number of the plurality of transmit signals.

The transforming executed by the instructions of the medium of an embodiment varies a polarization angle of the at least one input stream.

The transforming executed by the instructions of the medium of an embodiment varies a signal strength of the at least one input stream.

The transforming executed by the instructions of the medium of an embodiment applies a time domain shift to the at least one input stream.

The transforming executed by the instructions of the medium of an embodiment applies a progressive phase shift to the at least one input stream.

The transforming executed by the instructions of the medium of an embodiment applies a phase ramp to the at least one input stream.

The phase shift of an embodiment includes a phase shift of tones of the at least one input stream.

The signal shaping of an embodiment includes shaping an amplitude of tones of the at least one input stream.

The transforming executed by the instructions of the medium of an embodiment includes a first transforming of the at least one input stream.

The transforming executed by the instructions of the medium of an embodiment includes a second transforming applied to at least one signal output of the first transforming, wherein the second transforming outputs the transmit signals.

The antenna virtualization of an embodiment includes a device comprising a processor coupled to a virtualization component. The virtualization component of an embodiment is coupled to at least one input stream from a communication system and includes a plurality of outputs coupled to a plurality of antennas. The virtualization component of an embodiment is configured to generate a plurality of transmit signals from the at least one input stream by applying at least one signal transformation to the at least one input stream. Each one of the plurality of transmit signals of an embodiment is transmitted by a respective one of the plurality of antennas so that collective transmissions of the plurality of antennas form a radiation pattern that appears to originate from at least one virtual antenna. A number of the virtual antennas of an embodiment is fewer than a number of the plurality of antennas.

The antenna virtualization of an embodiment includes a device comprising a plurality of transmit antennas. The antenna virtualization of an embodiment includes a virtualization component coupled to the plurality of transmit antennas. The virtualization component of an embodiment is coupled to at least one input stream from an encoder. The virtualization component of an embodiment is configured to generate a plurality of communication signals from the at least one input stream by applying at least one signal transformation to the at least one input stream. Each one of the plurality of communication signals of an embodiment is transmitted by a respective one of the plurality of transmit antennas so that collective transmissions of the plurality of transmit antennas form a radiation pattern that appears to originate from at least one virtual antenna. A number of the virtual antennas of an embodiment is fewer than a number of the plurality of transmit antennas.

Aspects of the antenna virtualization described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the antenna virtualization include: microcontrollers with memory (such as electronically erasable programmable read only memory (EEPROM)), embedded microprocessors, firmware, software, etc. Furthermore, aspects of the antenna virtualization may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the antenna virtualization is not intended to be exhaustive or to limit the systems and methods to the precise form disclosed.

While specific embodiments of, and examples for, the antenna virtualization are described herein for illustrative purposes, various equivalent modifications are possible within the scope of other systems and methods, as those skilled in the relevant art will recognize. The teachings of the antenna virtualization provided herein can be applied to other processing systems and methods, not only for the systems and methods described above.

The elements and acts of the various embodiments described above can be combined to provide further embodiments. These and other changes can be made to the antenna virtualization in light of the above detailed description.

In general, in the following claims, the terms used should not be construed to limit the antenna virtualization to the specific embodiments disclosed in the specification and the claims, but should be construed to include all communication systems that operate under the claims. Accordingly, the antenna virtualization is not limited by the disclosure, but instead the scope of the antenna virtualization is to be determined entirely by the claims.

While certain aspects of the antenna virtualization are presented below in certain claim forms, the inventors contemplate the various aspects of the antenna virtualization in any number of claim forms. Accordingly, the inventors reserve the right to add additional claims after filing the application to pursue such additional claim forms for other aspects of the antenna virtualization.

What is claimed is:

1. A method comprising:
   receiving at least one input stream of communication signals;
   generating a plurality of transmit signals from the at least one input stream by transforming the at least one input stream, the transforming including applying a phase shift, to information of the at least one input stream; wherein the phase shift includes a phase shift of tones of the at least one input stream, and wherein the phase shift is approximately $$\exp(-j2\pi k\delta/N),$$

wherein k represents a tone index and N represents a number of the tones; and
   transmitting each one of the plurality of transmit signals by a respective one of a plurality of antennas, wherein collective transmission of the plurality of transmit signals form a radiation pattern that appears to originate from at least one virtual antenna, wherein a number of the virtual antennas is fewer than a number of the plurality of antennas.

2. The method of claim 1, wherein the transforming varies at least one parameter of the at least one input stream.

3. The method of claim 2, wherein the at least one parameter includes one or more of polarization angle, signal strength, phase, and symbol position.

4. The method of claim 1, wherein the transforming varies a polarization angle of the at least one input stream.

5. The method of claim 1, wherein the transforming varies a signal strength of the at least one input stream.

6. The method of claim 1, wherein the transforming applies a time domain shift to the at least one input stream.

7. The method of claim 1, wherein the transforming applies a progressive phase shift to the at least one input stream.

8. A method comprising:
   receiving at least one input stream of communication signals;
   generating a plurality of transmit signals from the at least one input stream by transforming the at least one input stream, the transforming including applying one or more of a variable delay, a phase shift, and signal shaping to information of the at least one input stream, wherein the transforming applies a phase ramp to the at least one input stream; and
   transmitting each one of the plurality of transmit signals by a respective one of a plurality of antennas, wherein collective transmission of the plurality of transmit signals form a radiation pattern that appears to originate from at least one virtual antenna, wherein a number of the virtual antennas is fewer than a number of the plurality of antennas.

9. The method of claim 8, wherein the phase ramp has one of a negative and positive slope.

10. A method comprising:
    receiving at least one input stream of communication signals;
    generating a plurality of transmit signals from the at least one input stream by transforming the at least one input stream, the transforming including applying one or more of a variable delay, a phase shift, and signal shaping to information of the at least one input stream, wherein the transforming includes a first transforming of the at least one input stream, wherein the transforming includes a second transforming applied to at least one signal output of the first transforming, wherein the second transforming outputs the transmit signals, wherein the first transforming includes a first transformation operation and a second transformation operation applied to an input stream, wherein the second transforming includes:
    a third transformation operation that outputs a first transmit signal to a first antenna;
    a fourth transformation operation that outputs a second transmit signal to a second antenna;
    a fifth transformation operation that outputs a third transmit signal to a third antenna; and
    a sixth transformation operation that outputs a fourth transmit signal to a fourth antenna; and
    transmitting each one of the plurality of transmit signals by a respective one of a plurality of antennas, wherein collective transmission of the plurality of transmit signals form a radiation pattern that appears to originate from at least one virtual antenna, wherein a number of the virtual antennas is fewer than a number of the plurality of antennas.

11. The method of claim 10, wherein the second transformation operation applies the variable delay to the input stream.

12. The method of claim 10, wherein the third and fifth transformation operations apply a first amplitude shaping to an output of the first transformation operation, and the fourth and sixth transformation operations apply a second amplitude shaping to an output of the second transformation operation.

13. The method of claim 12, wherein the first transformation operation applies the first amplitude shaping and the second transformation operation applies the second amplitude shaping.

14. The method of claim 10, wherein one or more of the second transformation, fourth transformation, and sixth transformation applies one or more of a progressive phase shift operation and a time domain shift operation to an input.

15. The method of claim 10, wherein the first transforming includes:
    a first transformation operation that outputs a first transmit signal to a first antenna; and
    a second transformation operation that outputs a second transmit signal to a second antenna.

16. The method of claim 15, wherein the second transformation operation applies the variable delay to the input stream.

17. A method comprising:
receiving at least one input stream of communication signals;
generating a plurality of transmit signals from the at least one input stream by transforming the at least one input stream, the transforming including applying one or more of a variable delay, a phase shift, and signal shaping to information of the at least one input stream, wherein the transforming comprises a first transforming of first and second input streams, wherein the first transforming includes:
a first transformation operation that outputs a first transmit signal to a first antenna;
a second transformation operation that outputs a second transmit signal to a second antenna;
a third transformation operation that outputs a third transmit signal to a third antenna;
a fourth transformation operation that outputs a fourth transmit signal to a fourth antenna; and
transmitting each one of the plurality of transmit signals by a respective one of a plurality of antennas, wherein collective transmission of the plurality of transmit signals form a radiation pattern that appears to originate from at least one virtual antenna, wherein a number of the virtual antennas is fewer than a number of the plurality of antennas.

18. The system of claim 17, wherein the first and second transformation operations apply a first amplitude shaping to the first input stream, and the third and fourth transformation operations apply a second amplitude shaping to the second input stream.

19. The method of claim 1, wherein the transmit signals are orthogonal frequency-division multiplexing (OFDM) signals in a wireless digital communications system.

20. A method comprising:
generating a plurality of transmit signals from the at least one input stream by transforming the at least one input stream, the transforming including applying a phase shift, to information of the at least one input stream; wherein the phase shift includes a phase shift of tones of the at least one input stream, and wherein the phase shift is approximately $$\exp(-j2\pi k\delta/N),$$

wherein k represents a tone index and N represents a number of the tones; and
transmitting each one of the plurality of transmit signals by a respective one of a plurality of antennas, wherein collective transmission of the plurality of transmit signals form a radiation pattern that appears to originate from at least one virtual antenna, wherein a number of the virtual antennas is fewer than a number of the plurality of antennas.

21. A computer readable medium including executable instructions which, when executed in a processing system, provide a communications system that transmits signals by:
receiving at least one input stream of communication signals;
generating a plurality of transmit signals from the at least one input stream by transforming the at least one input stream, the transforming including applying one or more of a variable delay, a phase shift, and signal shaping to information of the at least one input stream; wherein the phase shift includes a phase shift of tones of the at least one input stream, and wherein the phase shift is approximately $$\exp(-j2\pi k\delta/N),$$

wherein k represents a tone index and N represents a number of the tones; and
transmitting each one of the plurality of transmit signals by a respective one of a plurality of antennas, wherein a number of the at least one input streams is less than a number of the plurality of transmit signals.

22. The medium of claim 21, wherein the transforming varies a polarization angle of the at least one input stream.

23. The medium of claim 21, wherein the transforming varies a signal strength of the at least one input stream.

24. The medium of claim 21, wherein the transforming applies a time domain shift to the at least one input stream.

25. The medium of claim 21, wherein the transforming applies a progressive phase shift to the at least one input stream.

26. The medium of claim 21, wherein the transforming applies a phase ramp to the at least one input stream.

27. The medium of claim 21, wherein the phase shift includes a phase shift of tones of the at least one input stream.

28. The medium of claim 21, the signal shaping includes shaping an amplitude of tones of the at least one input stream.

29. The medium of claim 21, wherein the transforming includes a first transforming of the at least one input stream.

30. The medium of claim 29, wherein the transforming includes a second transforming applied to at least one signal output of the first transforming, wherein the second transforming outputs the transmit signals.

* * * * *